Oct. 31, 1967       J. R. YOUNG       3,350,590
MINIATURE IONIZATION GAGE INCLUDING A GRID HAVING
MULTITUDINOUS DISCRETE OPENINGS
Filed July 8, 1966
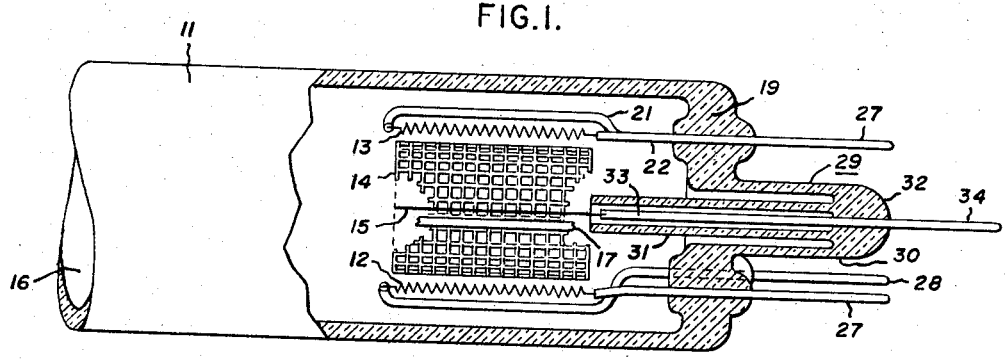
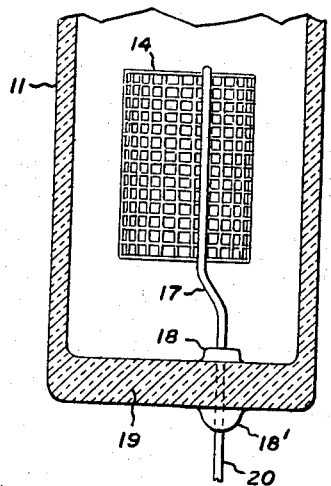
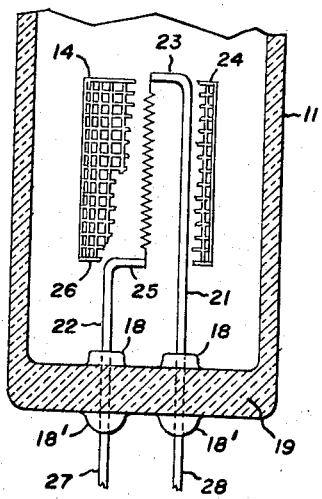
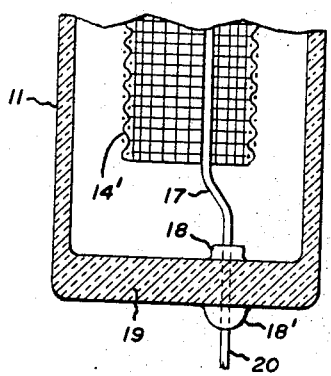
INVENTOR:
JAMES R. YOUNG,
BY *James K Lichiello*
HIS ATTORNEY.

United States Patent Office 3,350,590
Patented Oct. 31, 1967

3,350,590
MINIATURE IONIZATION GAGE INCLUDING A GRID HAVING MULTITUDINOUS DISCRETE OPENINGS
James R. Young, Rexford, N.Y., assignor to General Electric Company, a corporation of New York
Filed July 8, 1966, Ser. No. 563,870
6 Claims. (Cl. 313—7)

ABSTRACT OF THE DISCLOSURE

A miniature ionization gage capable of measuring pressures down to $10^{-10}$ torr with good sensitivity which includes grid having multitudinous discrete openings of small size (about 0.038 inch in area).

---

This invention relates to an ionization gage, and more particularly, to a miniaturized ionization vacuum gage which is capable of measuring pressures between about $3 \times 10^{-1}$ torr and $10^{-10}$ torr. This application is a continuation-in-part application of parent application Ser. No. 298,333, filed July 24, 1963, now abandoned, and assigned to the same assignee as the present invention.

The operation of an ionization gage in general depends on the emission of electrons from a heated source and their acceleration into an ionization region where gas molecules may be ionized. These ions are then electrically collected, and the ratio of the ion current to the electron current is taken as a measure of the pressure within the gage. One common and well-known type of ionization gage is referred to as the Bayard-Alpert type gage, see U.S. Patent 2,605,431, Bayard and U.S. Patent 2,727,167, Alpert.

One general trend of vacuum technology is towards systems or apparatus of very low pressures, or very high vacuum, and for these conditions it is necessary to have a highly sensitive ionization gage. In a great number of these high vacuum apparatuses it is desirable to provide an ionization pressure gage as a part of the system or the apparatus so that the gage itself should add only minimal projection. In those vacuum apparatuses where the volume to be evacuated is very small, larger prior art ionization gages add extensively to the volume to be evacuated and increase the evacuating time. In still other vacuum apparatus it may be desirable to seal the ion gage within the volume to be evacuated so that a small or miniature gage is highly desirable. In this respect prior art ion gages are of relatively large size in order to attain high sensitivity. Miniaturization or reducing the size of these ion gages is exceedingly difficult because of electrode and envelope features which become critical upon miniaturization and therefore detract from the overall gage sensitivity to be attained.

Accordingly, it is an object of this invention to provide an improved ionization gage.

It is a further object of this invention to provide an improved ionization gage of reduced size.

It is yet another object of this invention to provide an improved small ionization gage capable of measuring pressure between about $3 \times 10^{-1}$ and $10^{-10}$ torr.

It is another object of this invention to provide an improved ionization gage having an enclosed volume of about 20 cc. and utilizing a cylindrical accelerating electrode structure having multitudinous very small perforations or apertures therein.

This invention will be better understood when taken in connection with the following description and the drawings in which—

FIG. 1 is a cross sectional illustration of one preferred embodiment of this invention;

FIG. 2 is a cross sectional and partial illustration of the arrangement and supporting means for a grid structure of FIG. 1;

FIG. 3 is a partial and sectional illustration of the arrangement and supporting means for the filaments of FIG. 1;

FIG. 4 is a modification of the grid structure of FIG. 1.

Briefly described, this invention in its preferred form relates to a miniaturized ionization gage having, for example, an enclosed volume of about 20 cc. or less, and which includes a cylindrical accelerating electrode structure having multitudinous or myriad perforations as discrete or separate defined apertures in the wall thereof. The cylindrical electrode is usually contained in a small cylindrical envelope which, because of the small diameter of the cylindrical electrode, does not include any necked-down portion. The gage also includes a pair of electrically separate thermionically emissive filaments, with prescribed sizes and positioning to provide a miniature ionization gage of high sensitivity.

Various attempts have also been made to reduce the overall size or volume of ion gages for many reasons in addition to the mentioned reasons, for example, for the purposes of overall economy and for improved operating characteristics. However, the operating characteristics of ion gages in general are such that, with a general scaling down of the gage, it is to be expected that the pressure sensitivity of the ion gage also decreases. Accordingly, the resulting smaller gages are inapplicable for many low pressure applications and at the same time may not measure higher pressures. There are, however, considerable advantages, as described, in miniature or reduced ionization gages which make it imperative to have these gages in miniature form.

It has been discovered that an ionization gage may be made of a very small size with a very high sensitivity. Such a miniaturized ionization gage in one form is illustrated in cross section in FIG. 1.

Referring now to FIG. 1, an exemplary miniature ionization gage 10 comprises an envelope structure 11 which contains the usual electrodes 12 and 13, denoted as thermionic emissive electrodes which supply or emit electrons, accelerating grid electrode 14 to accelerate the electrons therein to ionize gas, and collector electrode 15 to electrically collect positive gas ions. While envelope may be made of various materials including metals and nonmetals, in one preferred form of this invention as illustrated, envelope 11 is of a suitable hard glass, very resistant to high temperatures, sealable to metals, and generally having a close coefficient of expansion to metals employed therewith. Such a glass may be, for example, Corning 7056 or Nonex glass or Pyrex glass graded to Corning 7056 or Nonex glass at junctures. One preferred metal for the envelope of this invention is stainless steel for example 304. In many instances, however, an envelope may be dispensed with and the gage is positioned within the enclosure in which pressure is to be measured. These latter gages are referred to as "nude" gages.

Envelope 11 includes an open end 16 which, because of gage miniaturization or small size, is not necked down as prior gages usually are for joining to existing apparatus. The inside diameter of the envelope structure 11, which is in the form of a right circular cylinder, is coextensive at least through a major portion of cylinder 11 from the electrode structure to open end 16. The straight axial opening or bore 16 provides a standard size opening which may be joined directly to various vacuum apparatus with operating characteristics of the entire system not affected by the usual pressure drop associated with necked-down envelopes or side wall tubulations. This type of opening, together with the feature that this envelope includes only a volume of about 20 cc. or less, leads to rapid evacuation of the instrument and concurrent rapid evacuation of the apparatus to which it is attached.

Electrode 14 is denoted as the accelerating grid anode electrode and is an important part of the miniaturized ionization gage. The overall sensitivity of this miniature gage and other improved operating characteristics of this miniature gage dependent to a large extent upon the accelerating grid electrode and its particular structure. Small changes in the grid structure are usually accompanied by inordinately larger changes in the operating characteristics. Therefore, a mere scaled reduction in size of existing accelerator grid electrode structures does not lead to miniaturization with accompanying high sensitivity. It has been discovered that a miniature ionization gage of the mentioned volume or size may be produced to have concurrent high sensitivity for measuring pressures between about $3 \times 10^{-1}$ torr and $10^{-10}$ torr, with a cylindrical grid electrode 14 in the form of an apertured or foraminous cylindrical wall rather than other structural forms such as helices, spirals, et cetera. While certain metals such as molybdenum and tantalum have been employed in electrode structure 14, best overall results are obtained, especially at lower pressures, when the material utilized is high purity tungsten with the overall dimensions of the cylinder being about 0.75 inch length and 0.5 inch diameter. Tungsten is a more desirable material because of its overall stability. Molybdenum for example is subject to some deleterious oxidation, and when bombarded by electrons gives off or emits, under some conditions, positive oxygen ions which affect gage operation by indicating readings suggestive of a higher X-ray limit.

The perforate or foraminous grid structure of electrode 14 should also be of substantial electron transparency so that electrons may pass freely through the openings without extensive collision. The total opening area is substantially greater than the total area of the defining structure. In one form of this invention electrode 14 was of about 90% transparency. At the same time, however, electrode 14 must have sufficient electrode area to act as an electron accelerating electrode in the gage volume, and should also have considerable strength at high temperatures for outgassing purposes.

In one preferred form of this invention electrode 14 comprises a thin cylindrical shell of tungsten sheet of about 0.001 inch thickness. This shell is foraminous including multitudinous or myriad discrete openings in the wall thereof (as illustrated in FIG. 1) extending over substantially all of the wall area. The individual openings are of very small size, for example about 0.038 inch average diameter or side dimension spaced on about 0.040 inch centers (25 mesh). Foraminous sheets or cylinders as described are manufactured by the well known photo etching processes. In such processes the combination of light and a grid shadow is projected on a tungsten surface coated with a light responsive material to develop an outlined grid surface on the tungsten. In the final step the tungsten is exposed to an acid bath where the acid etches away preferential areas leaving a foraminous perforate or grid-like structure, which in cross section discloses a pair of parallel walls having apertures therethrough. The apertures may be of various configurations including circles, squares, et cetera. Cylinders as described are commercially available in a wide range of opening sizes and have provided best results in this invention.

The above mentioned features may also be obtained in the practice of this invention with a grid structure electrode 14' as illustrated in FIG. 4. The grid structure of FIG. 4 is formed from 0.002 inch diameter tungsten wire with individual wire separation or wire centers of about 0.040 inch to provide a square mesh or screen grid structure. The mesh grid 14' is applicable for use in the embodiment of FIG. 1 in place of the etch grid 14 illustrated therein. High sensitivity is attained with such a foraminate or fine mesh structure unexpectedly in view of the usual teaching of large openings being required for accelerating electrodes. Very wide mesh or larger aperture anodes do not maintain a uniform potential across the openings so that an electron is attracted or accelerated, not only to the electrode as a whole, but also to individual grid wires or aperture peripheries where collision occurs. Such collisions should be minimized because the electron fails to enter the accelerating cylindrical electrode to ionize gas therein. It is a function of either the closely spaced fine wire grid structure or foraminate structure to provide more uniform potential along the electrode 14 so that in a sense the electrons are initially attracted to the electrode 14 as a whole, but, because of their high velocity, upon approaching the electrode 14 they are unable to veer towards individual strands or peripheral structure and thus pass through the electrode 14 to ionize gas in the interior thereof. Both the structural integrity and electrical effectiveness of the electrodes 14 and 14' are superior to helical accelerating electrodes as well as accelerating electrode grids of larger openings. The perforated cylindrical sheet also provides a better defined aperture for the electrons since the aperture periphery is of a constant planar structure as opposed to a woven wire mesh opening.

Electrode 14 is supported in concentric spatial relationship in cylindrical envelope 11 and adapted for electrical connection thereto by means illustrated in FIG. 2. Referring now to FIG. 2 there is shown in cross section, envelope 11 having a grid electrode 14' supported concentrically therein. Grid electrode 14' is supported by means of a platinum coated tungsten wire or rod 17 extending axially along the side of grid 14 and suitably attached thereto by such means for example as welding. Rod 17 extends downwardly past grid 14 and is attached to a Kovar rod 20 by welding which passes through raised glass beads 18 in base 19 of envelope 11.

Referring again to FIG. 1 a pair of thermionic emissive cathode filaments 12 and 13 are employed to provide electrons in the ion gage. These filaments 12 and 13 are carefully constructed and positioned in this gage commensurate with the overall critical dimensions and operative characteristics. In the preferred form of this invention as illustrated, filament 12 is of tungsten wire of about 0.005 inch diameter, and constructed in the form of a spiral or helix of 0.030 inch diameter with a spacing or lead of 0.060 inch between turns. Filament 13 is similar in all respects to filament 12 but is preferably of thoria-coated iridium wire. Each filament 12 and 13 is supported and positioned in the same manner. For example, filament 12 is positioned to lie parallel with grid electrode 14 in axial alignment therewith and spaced about 1.5 millimeters from the cylindrical wall of grid electrode 14. This spacing is also chosen to be sufficiently close to enable the gage to obtain pressure measurements at higher pressures. Filament 12 is supported in the mentioned position by means of axial supporting rods or wires 21 and 22 as more clearly illustrated in FIG. 3.

Referring now to FIG. 3, a first tungsten rod 21 passes through base 19, and also beads 18 and 18', to extend axially along grid electrode 14, bending at a 90° bend 23 tangentially to and at the upper extremity 24 of grid structure 14. Adjacent and parallel to rod 21 is a further tungsten rod 22, extending through base 19 and additional beads 18 and 18', ending in a 90° bend 25 which is tangential to grid electrode 14 at the bottom 26 of grid 14, and opposite to bend 23. Filament 12 is then suitably attached, for example, by welding to rod 21 on the end of bend 23, and to rod 22 at the end of bend 25. Suitable nickel pins or prongs 27 and 28 are then welded to rods 21 and 22 respectively at the outer or external surface of the beads 18' for electrical socket connecting purposes.

An ion collector electrode 15 is positioned concentrically within accelerating anode grid 14, and comprises a thin tungsten probe wire of about 0.004 inch diameter. Probe electrode 15 extends concentrically through cylindrical grid electrode 14 and is supported by a pantleg supporting structure 29 which is a part of envelope 11 and of the same material, for example Nonex glass. Supporting structure 29 comprises an axially externally projecting hollow cylindrical glass member 30 projecting from the bottom of base 19. A hollow glass tube 31 is concentrically positioned within the hollow cylinder member 30 and extends from an integral juncture at the base 32 of cylinder 30 to extend internally of envelope 11 to the bottom 26 of grid 14. Tube 31 is spaced inwardly from the wall of cylinder 30. A tungsten rod 33 is concentrically positioned within tube 31, passes through base 32 of member 30 and externally of envelope 11 at one end, and at the other end extends through tube 31 to just short of the end of tube 31. Probe electrode 15 is then suitably joined to the tungsten rod 33 in tube 31, for example by welding. A nickel pin or prong 34 is joined to tungsten rod 33 at the external surface of the base 33. The purpose of the pantleg construction, i.e., reentrant tube 31 and rod 33, is to reduce electrical leakage to the ion collector probe electrode 15, and to prevent X-rays produced at the grid 14 from reaching support rod 33.

In the operation of the above described miniature ionization gage, accelerating grid electrode 14 is connected in an electrical circuit so that it is at a positive potential with respect to filament electrode 13, for example at about 100 volts. The probe electrode 15 is connected into an electrical circuit so as to have a negative potential with respect to filament 13, for example at about 25 volts. The thoria-coated iridium filament 13 provides adequate electron emission for pressure measurement above about $10^{-3}$ torr in air or other oxidizing atmospheres. This filament also provides burnout protection in case of accidental exposure to atmospheric pressure during operation. At lower pressures, the thoria-coated iridium filament 13 provides a low temperature electron source reducing gas reactions which occur when gas atoms or molecules strike hot filaments. This filament also provides the necessary electron emission at a very low power input, usually 2 watts for 1 milliampere emission, and this reduces outgassing of envelope wall 11 and other electrodes. Tungsten filament 12 is used primarily for outgassing of grid 14 by electron bombardment and also for measuring low pressures by the well known flash filament technique. The thoria-coated iridium filament 13 is thus operated at about 1.5 volts, 1.5 amps, and 2.2 watts, with the tungsten filament 12 operated at about 2.5 volts, 1.7 amps, and 4.3 watts. The electrical separate arrangement of filaments 12 and 13 permits operation of the gage in the event one of the filaments becomes shorted by contact with the grid electrode.

During operation of the miniature gage as described, a thermionically emissive cathode filament such as filament 13 is heated by electrical resistance heating and electrons are emitted and accelerated radially outwardly towards the accelerating electrode grid 14, which is maintained at a positive potential with respect to the filament. These electrons are accelerated to high velocities and pass through the open mesh of grid 14 and substantially the entire volume within grid 14 is subjected to high velocity electrons which ionize gas molecules upon contact therewith. The ion collector electrode or probe 15 which is more negatively charged, with respect to filament 13 and also negative with respect to the accelerating grid 14, collects the positive ions generated by the mentioned collisions. The current in the probe circuit caused by the ion collection constitutes a measure of the pressure within the envelope 11. For example, if the electron current in envelope 11 is held constant, the number of ions produced per unit of time will be substantially proportional to the pressure of gas inside the tube. Therefore, since the current passing through the probe collector is proportional to the number of ions which reach the ion collector probe per unit of time, the current reading in that circuit is an indication of the pressure in the gage.

The objects of this invention are believed to be achieved by the particular structural features of this gage as described in this specification. More particularly, the high sensitivity of this miniature ionization gage is believed to be derived from those specific structural features associated with the tungsten grid 14 or 14' and its physical and operative relationship to the remaining elements of the gage.

A miniature ionization vacuum gage is described which provides such important features as about three inches length and one inch diameter, about 20 cc. enclosed volume, and about 20 grams weight. These features taken in connection with minimal power requirements extend applications of ion gages to increasingly complex apparatus. For example, the combination described provides a gage of extended range. Other gages measure pressures in the range of $10^{-3}$ to $10^{-10}$ torr. In order to measure pressures above $10^{-3}$ torr these gages are so constructed that their lower limit is $10^{-8}$ torr. The gage of this invention includes a range of $10^{-3}$ to $10^{-10}$ torr.

While specific embodiments of this invention have been shown and described it is not desired that this invention be limited to those particular forms as illustrated and described, and it is intended by the appended claims to cover all modifications within the spirit and scope of this invention.

What is claimed as new and desired to be secured by Letters Patent of the United States is:

1. A miniature ionization gage comprising in combination
   (a) a cylindrical envelope structure of minimal dimensions enclosing a volume of a maximum of about 20 cc.,
   (b) said cylindrical envelope structure having a closed base end and an open opposite attachment end and a constant internal diameter therethrough,
   (c) a hollow cylindrical open grid tungsten electrode positioned concentrically in said tube adjacent said closed end,
   (d) said grid including multitudinous discrete openings therethrough of about 0.038 inch opening size,
   (e) an electrical connector connecting said screen externally through said envelope base end,
   (f) a pair of helical electrode filaments oppositely disposed with said screen therebetween and extending axially along said screen and spaced therefrom,
   (g) separate electrical connector means connecting said filaments individually through said envelope base end,
   (h) a thin tungsten wire probe electrode positioned in and concentric with said screen, and
   (i) electrical connector means connecting said probe externally through said envelope base end.

2. The invention as recited in claim 1 wherein said helical filaments consist of 0.005 inch diameter wire with a 0.030 inch diameter spiral and a 0.060 inch lead with one filament of tungsten and the other of thoria-coated iridium.

3. The invention as recited in claim 2 wherein said filaments are spaced from said grid electrode about 1.5 millimeter and where the effective length of all electrodes is about 0.75 inch.

4. A miniature ionization gage comprising in combination
   (a) a cylindrical envelope structure of about three inches length and about one inch outside diameter with the inside diameter coextensive through substantially the entire length of said cylinder,
   (b) said envelope structure enclosing a volume of about 20 cc.,
   (c) said envelope having a closed base end and an opposite open end, (d) and a cylindrical grid electrode coaxially positioned in said envelope adjacent said base end, (e) said grid consisting of a tungsten sheet of about 0.001 inch thickness provided with multitudinous discrete apertures of about 0.038 average opening size and at about 0.040 inch centers, (f) a first axially extending helical filament electrode disposed parallel to the axis of said cylindrical grid and spaced within about 1.5 millimeter of said cylindrical grid, (g) said helical filament electrode consisting of a tungsten wire of about 0.005 inch diameter tungsten wound with a 0.030 inch diameter spiral and with a 0.060 inch lead, (h) a second filament oppositely disposed with respect to said first filament with said cylindrical grid electrode therebetween, (i) said second filament electrode spaced to within about 1.5 millimeter of said cylindrical grid electrode, (j) said second filament electrode extending axially along said cylindrical grid electrode and parallel to the longitudinal axis thereof, (k) said second filament electrode being formed of about 0.005 inch diameter thoria-coated iridium with a 0.030 inch diameter spiral and with 0.060 inch between turns, (l) and tungsten wire probe of about 0.004 inch diameter concentrically positioned within said cylindrical mesh, (m) the active length of each electrode being about three-fourths inch, (n) means joining each of said electrodes separately through said envelope base end externally of said envelope for individual connection to a source of power, (o) said envelope structure having a pantleg structure extending therewithin and surrounding said means connecting said tungsten probe electrode externally of said envelope.

5. In a miniature ion vacuum gage of about 20 cc. volume comprising a cylindrical accelerating anode, a thermionic emissive filament electrode adjacent thereto, and a straight probe wire electrode positioned coaxially therein, the improvement comprising (a) a cylindrical shell grid structure for said accelerating anode, (b) said grid structure being characterized by having multitudinous small discrete apertures therethrough, (c) said cylindrical grid structure being less than about one inch diameter and less than about one inch length, (d) said grid structure being a coextensive sheet of tungsten having multitudinous perforations therethrough in a ratio where the area of the openings represents about 90% transparency.

6. In a miniature ion vacuum gage of about 20 cc. volume comprising a cylindrical accelerating anode, a thermionic emissive filament electrode adjacent thereto, and a straight probe wire electrode positioned coaxially therein, the improvement comprising (a) a cylindrical shell grid structure for said accelerating anode, (b) said grid structure being characterized by having multitudinous small discrete apertures therethrough, (c) said cylindrical grid structure being less than about one inch diameter and less than about one inch length, (d) said grid structure being a tungsten wire mesh of about 0.002 inch wire on about 0.040 inch centers.

References Cited
UNITED STATES PATENTS

| | | | |
|---|---|---|---|
| 2,573,005 | 10/1951 | Glyptis | 313—7 X |
| 2,605,431 | 7/1952 | Bayard | 313—7 |
| 3,071,704 | 1/1963 | Reich | 313—7 |
| 3,274,326 | 9/1966 | Morris et al. | 313—7 |

ROBERT SEGAL, *Primary Examiner.*

JAMES W. LAWRENCE, *Examiner.*

R. JUDD, *Assistant Examiner.*